(12) United States Patent
Cheng et al.

(10) Patent No.: US 7,725,090 B2
(45) Date of Patent: May 25, 2010

(54) METHOD AND APPARATUS FOR AUTOMATIC FREQUENCY CORRECTION

(75) Inventors: Jian Cheng, Shanghai (CN); Jingdong Lin, Irvine, CA (US)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 938 days.

(21) Appl. No.: 11/326,043

(22) Filed: Jan. 5, 2006

(65) Prior Publication Data

US 2006/0233153 A1   Oct. 19, 2006

(30) Foreign Application Priority Data

Apr. 15, 2005   (CN)   ................ 2005 1 0025100

(51) Int. Cl.
*H04B 1/18* (2006.01)
(52) U.S. Cl. .................... 455/192.2; 375/344
(58) Field of Classification Search ... 455/192.1–192.3, 455/226.1–226.4; 375/344
See application file for complete search history.

(56) References Cited

U.S. PATENT DOCUMENTS

| | | | | |
|---|---|---|---|---|
| 4,597,107 | A * | 6/1986 | Ready et al. | 455/226.1 |
| 5,228,062 | A * | 7/1993 | Bingham | 375/344 |
| 5,276,710 | A * | 1/1994 | Iwasaki | 375/340 |
| 5,303,263 | A * | 4/1994 | Shoji et al. | 375/229 |
| 5,423,085 | A * | 6/1995 | Lim | 455/182.2 |
| 5,594,754 | A * | 1/1997 | Dohi et al. | 375/148 |
| 5,796,786 | A * | 8/1998 | Lee | 375/326 |
| 6,023,491 | A * | 2/2000 | Saka et al. | 375/326 |
| 6,353,642 | B1 * | 3/2002 | Asahara et al. | 375/344 |
| 6,522,696 | B1 * | 2/2003 | Mobin et al. | 375/262 |
| 6,810,097 | B1 * | 10/2004 | Yamagata | 375/344 |
| 6,862,325 | B2 * | 3/2005 | Gay-Bellile et al. | 375/340 |
| 6,956,915 | B2 * | 10/2005 | Sanchez et al. | 375/346 |
| 6,983,136 | B2 * | 1/2006 | Mason et al. | 455/307 |
| 6,996,156 | B1 * | 2/2006 | Ono | 375/147 |
| 7,016,404 | B2 * | 3/2006 | Yang | 375/229 |
| 7,123,670 | B2 * | 10/2006 | Gilbert et al. | 375/344 |
| 7,149,486 | B2 * | 12/2006 | Kurose | 455/226.2 |
| 7,209,716 | B2 * | 4/2007 | Maeda et al. | 455/119 |
| 7,218,893 | B2 * | 5/2007 | Larsson et al. | 455/63.1 |
| 7,298,806 | B1 * | 11/2007 | Varma et al. | 375/354 |
| 7,349,483 | B2 * | 3/2008 | Seki et al. | 375/260 |
| 2003/0058966 | A1 * | 3/2003 | Gilbert et al. | 375/326 |
| 2003/0063694 | A1 * | 4/2003 | Goldberg et al. | 375/344 |
| 2003/0171102 | A1 * | 9/2003 | Yang | 455/150.1 |
| 2004/0091026 | A1 * | 5/2004 | Nakayama | 375/148 |
| 2004/0190657 | A1 * | 9/2004 | Seki et al. | 375/347 |
| 2005/0135512 | A1 * | 6/2005 | Zhuang et al. | 375/344 |
| 2005/0226341 | A1 * | 10/2005 | Sun et al. | 375/260 |
| 2005/0272374 | A1 * | 12/2005 | Lewis | 455/67.11 |
| 2008/0212657 | A1 * | 9/2008 | Bjerke et al. | 375/150 |

* cited by examiner

*Primary Examiner*—Edward Urban
*Assistant Examiner*—RuiMeng Hu

(57) ABSTRACT

A technique is provided for automatic frequency offset correction in a wireless communication system. After demodulating and decoding a received signal in a receiver, channel estimation is also performed. The technique further includes re-encoding and re-modulating the decoded and demodulated signal with a coding and modulation scheme different from the received signal. The signal is reconstructed signal on the basis of the re-encoded and re-modulated signal and estimated channel characteristics. A frequency error is estimated based on the reconstructed signal and the original received signal. A threshold for a comparator is determined on the basis of the estimated offset amount determined by the comparison threshold and the estimated frequency offset.

9 Claims, 7 Drawing Sheets

METHOD AND APPARATUS FOR AUTOMATIC FREQUENCY CORRECTION

TECHNICAL FIELD OF THE INVENTION

The present invention relates to the field of wireless communications, and more particularly, to frequency error detection and correction within a wireless communication system receiver.

DESCRIPTION OF THE RELATED ART

In the typical wireless communication system, a frequency error exists in the received signal. This occurs because the frequency generated by the local frequency reference at the mobile station is different from that used by the base station in its transmission. Such frequency offset needs to be corrected to permit reliable demodulation of the data symbols. To overcome this problem, prior systems use an automatic frequency correction (AFC) unit to detect and correct this frequency error. FIG. 1 illustrates a block diagram of a typical receiver, which includes antenna 102 for receiving the signal, a filter unit 104 for signal filtering, an A/D converter 106, a demodulation and decoding unit 108 to demodulate and decode the generated analog output signal, a channel estimation unit 110 to conduct channel estimation for the received signal, and an automatic frequency correction apparatus 112 to detect and compensate for any frequency error. The offset estimate from the AFC 112 is then provided to the filter unit 104.

FIG. 2 shows the detailed arrangement of the automatic frequency correction section 112, which contains reconstruction unit 114, frequency offset estimation unit 116 and frequency offset adjustment unit 118. Referring to FIG. 2, the filtered output signal from A/D converter r(n) is referred to as the original received signal, which is fed into three sections: (1) the channel estimation unit 110 which uses r(n) to get the estimated channel h(n), (2) the demodulation and decoding unit 108 which uses r(n) as an input to generate a decoded signal b(n); and (3) r(n) also is input to frequency offset estimation unit 116 in the automatic frequency correction apparatus 112 for processing, which is to be detailed later below. In FIG. 2, the channel estimation unit 110 output is h(n) and demodulation and decoding unit 108 output is b(n), which are input into reconstruction unit 114 to generate a reconstructed signal r̃(n) Note that r̃(n) and r(n) are provided to frequency offset estimation unit 116 to make frequency error estimation, which is then output to the offset adjustment unit 118. In the offset estimate adjustment unit 118, the offset estimate is adjusted based on the estimated frequency offset. The adjusted offset estimate is passed back on to filter unit 104.

In the prior automatic frequency apparatus and method, the reconstructed signal r̃(n) is directly convolution encoded with the decoded signal b(n) and the estimated channel h(n). However this prior art is of relatively low-precision in frequency error compensation in actual applications. Therefore, a need exists for a highly-precise and refined frequency offset correction apparatus and method.

SUMMARY OF THE INVENTION

The present invention is directed towards providing an accurate frequency offset detection and compensation apparatus and method so as to improve the performance of the receiver.

According to one aspect of the present invention, an automatic frequency correction apparatus in the receiver of the wireless communication is provided. The demodulated and decoded received signal and estimated channel information is input to the correction apparatus, which includes a reconstruction unit, a frequency offset estimation unit, a frequency adjustment unit and a re-encoding/re-modulation unit and comparison unit. The re-encoding/re-modulation unit encodes and modulates the demodulated and decoded signal with the encoding and modulation scheme different from the previous scheme. The re-encoding/re-modulation unit and channel estimation unit outputs to the reconstruction unit to generate a reconstructed signal. The frequency offset estimation unit generates the amount of estimated frequency error on the basis of the reconstructed signal output from the reconstruction unit and the original received signal. The threshold detection unit determines the threshold for comparison based on the channel parameter output from the channel estimation unit. The offset estimate adjustment unit makes adjustments to the frequency offset estimate on the basis of the offset estimate and the comparison threshold.

According to another aspect of this invention, a wireless receiver is provided, which includes an antenna for receiving a signal, a filter unit for signal noise and interference filtering, an A/D converter, a demodulation and decoding unit for signal decoding and demodulation, a channel estimation unit for generating channel characteristics on the basis of received signal, and an automatic frequency correction unit for frequency correction based on the decoded and demodulated signal and estimated channel characteristic. The automatic frequency correction unit sends the adjusted frequency offset signal to the filter unit. The automatic frequency correction unit includes a reconstruction unit, a frequency offset estimation unit, a frequency offset estimate adjustment unit and re-encoding/re-modulation unit and a comparison unit.

The re-encoding/re-modulation unit encodes and modulates the demodulated and decoded signal with the encoding and modulation scheme different from the previous scheme. The re-encoding/re-modulation unit and channel estimation unit outputs to the reconstruction unit to generate a reconstructed signal. The frequency offset estimation unit generates the amount of estimated frequency error on the basis of the reconstructed signal output by the reconstruction unit and the original received signal. The threshold detection unit determines the threshold for comparison based on the channel parameter output from channel estimation unit. The offset estimate adjustment unit makes certain adjustment to the frequency offset estimate on the basis of the offset estimate and the comparison threshold.

According to a further aspect of this invention, a method for automatic frequency correction in a wireless communication system is provided. The method comprises: first, demodulating and decoding the original received signal in the receiver and making channel estimation. This method further includes re-encoding and re-modulating the decoded and demodulated signal with a coding and modulation scheme different from the former one. Next, reconstructing the signal on the basis of re-encoded and re-modulated signal and estimated channel is performed. Next, estimating the frequency error based on reconstructed signal and the original received signal is performed. Next, determining the threshold for comparison on the basis of the estimated channel and adjusting the offset estimate on the basis of the comparison threshold and the estimated frequency offset is performed.

In the mentioned automatic frequency correction apparatus, receiver, and method, the reconstructed signal is the convolutionally coded signal of the re-encoded and re-modulated signal and estimated channel characteristic. The frequency error can be mathematically obtained with the following calculation:

First, the signal x(n) is generated using the equation $$x(n)=conj(r(n)).*\tilde{r}(n)$$

where r(n) is the original received signal, $\tilde{r}(n)$ is reconstructed signal, .* denotes element-wise multiply operation, conj(.) denotes conjugate operation in 2N samples, $n=1,2,\ldots,2N$, phase offset theta can be obtained with the equation of:

$$theta = \frac{1}{N} \; mean[x(N+1:2N).*conj(x(1:N))],$$

where mean(.) denotes the arithmetic mean operation,

The desired frequency offset can be therefore calculated with the following equation:

$$f_{estimated} = \frac{theta}{2\pi T};$$

where T denotes symbol cycle of the received signal,

According to present the automatic frequency correction apparatus and method, generating the reconstructed signal by re-encoding and re-modulating the modulated and encoded signal, then using it to perform frequency error estimation, thus, the accuracy of frequency compensation in the wireless communication receiver can be improved.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
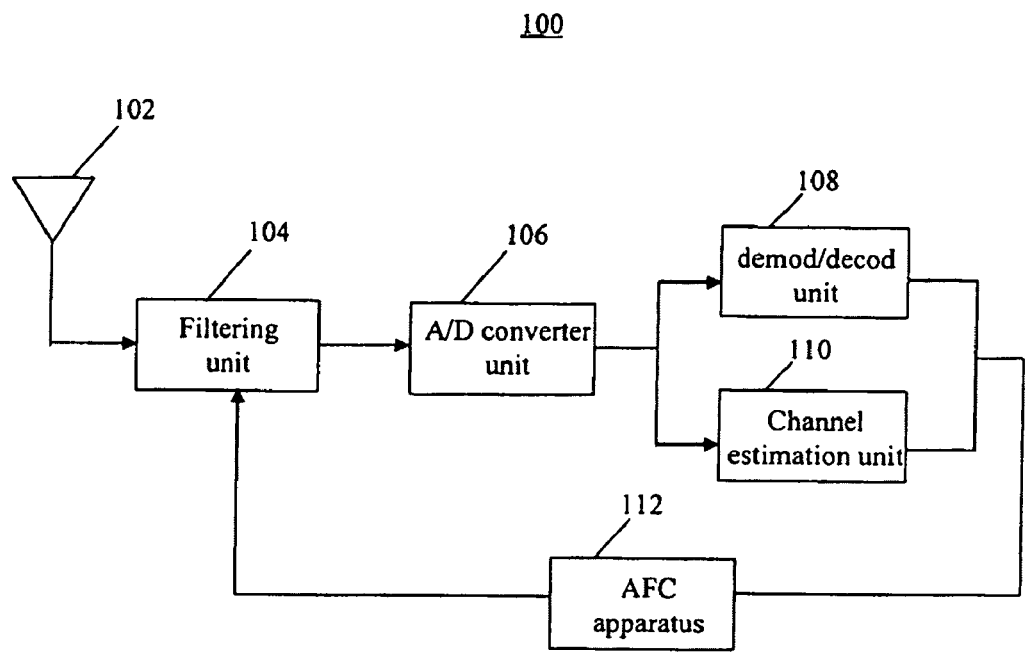
FIG. 1 is a block diagram of a prior art receiver in the wireless communication system.
Figure 2:
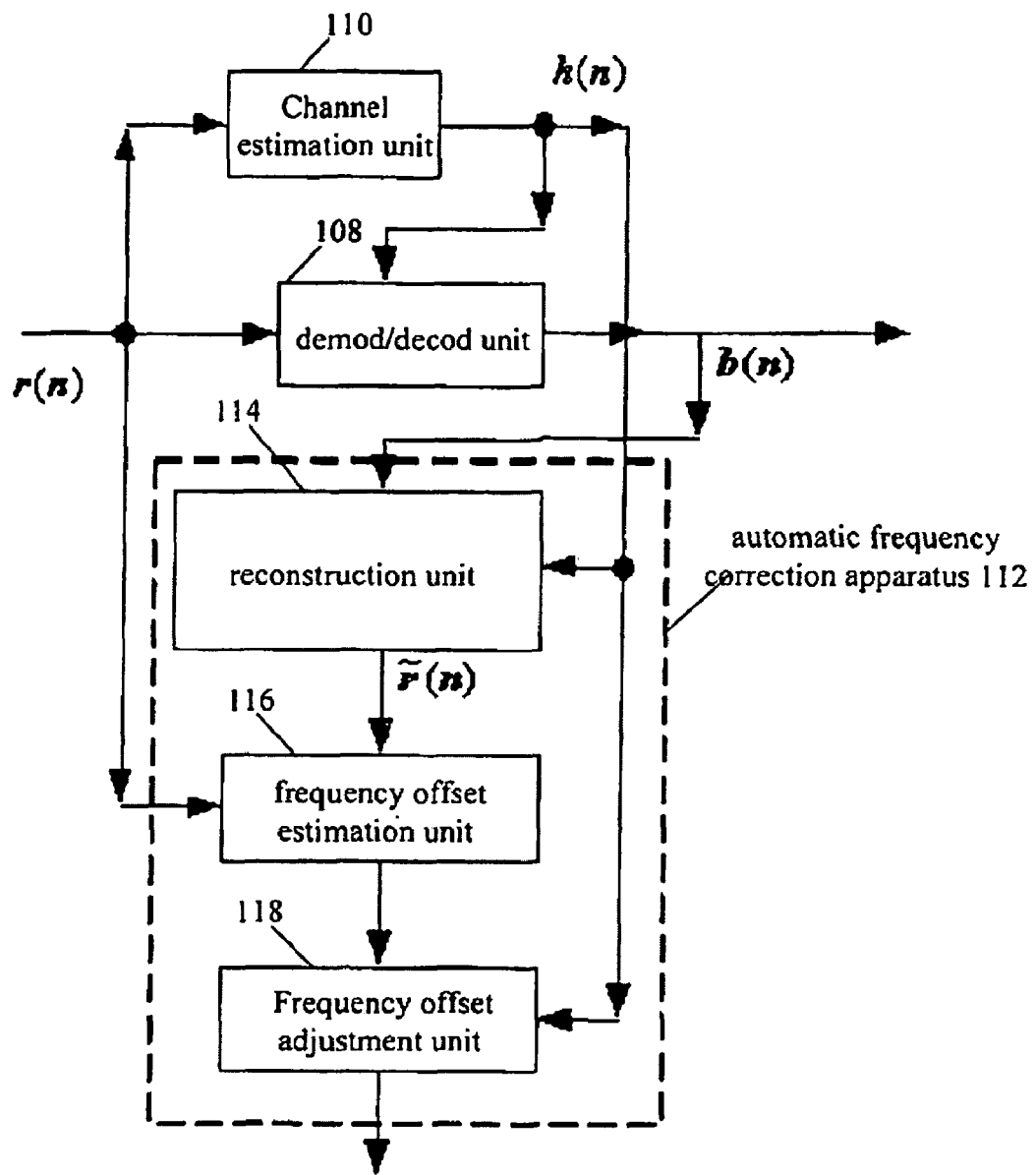
FIG. 2 is a block diagram depicting the arrangement of the automatic frequency correction apparatus in the prior art.

While the specification concludes with claims defining the features of the invention that are regarded as novel, it is believed that the invention will be better understood from a consideration of the following description in conjunction with the drawing figures.

In order to improve correction accuracy, the present automatic frequency correction re-encodes and re-modulates the modulated and encoded signal, and generates the reconstructed signal using the re-encoded and re-modulated signal and channel estimation.

Figure 4:
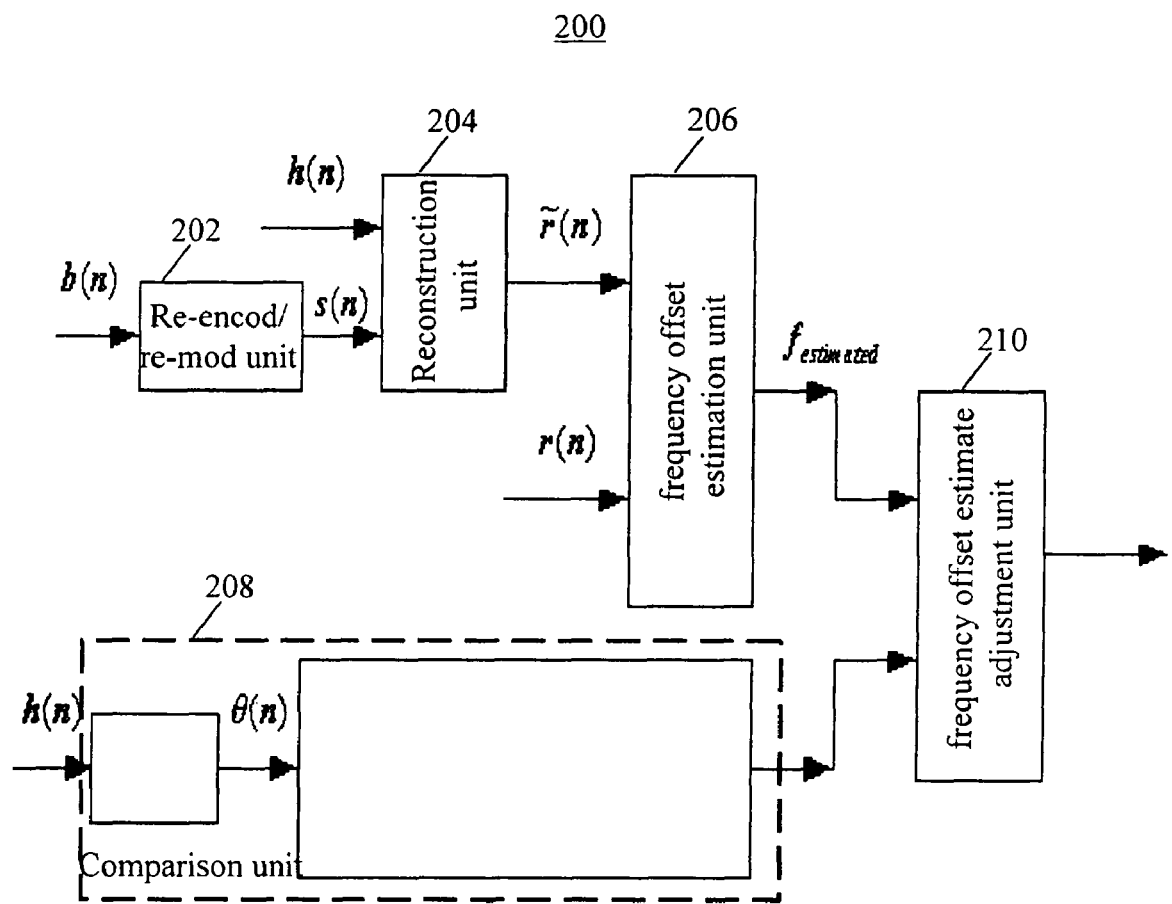
FIG. 4 is a block diagram depicting the arrangement of the receiver using the automatic frequency correction apparatus in accordance with the present invention.

In accordance with the invention, an apparatus for performing automatic frequency correction is provided. With reference to FIG. 4, the automatic frequency correction device 200 located in the wireless receiver takes the demodulated and decoded signal b(n) and estimated channel h(n) as its inputs. The device 200, similar to the conventional automatic frequency correction device, includes a reconstruction unit, a frequency offset estimation unit, and a frequency offset estimate adjustment unit.

Additionally, device 200 includes a re-encoded and re-modulated unit and comparison unit.

The re-encoding/re-modulation unit 202 receives demodulated and decoded signal b(n) and encodes and modulates b(n) using a coding and modulation scheme different from the one that generates signals b(n).

Reconstruction unit 204 receives the signal s(n), the output of re-encoded and re-modulation unit 202, and the estimated channel (n), converts the input into reconstructed signal $\tilde{r}(n)$. Similar to the prior art, reconstructed signal $\tilde{r}(n)$ is the convolutionally encoded product of the re-encoded and re-modulation signal s(n) and the estimated channel h(n) using the equation:

$$\tilde{r}(n)=s(n)\oplus h(n) \qquad \text{Equation 1}$$

The reconstruction unit 204 delivers its output signal $\tilde{r}(n)$ to frequency offset estimation unit 206, and original received signal r(n) is also input to unit 206 to calculate frequency error $f_{estimated}$. The $f_{estimated}$ calculation comprises of:

First, the signal x(n) is generated using the equation $$x(n)=conj(r(n)).*\tilde{r}(n) \qquad \text{Equation 2}$$

where r(n) is the original received signal, $\tilde{r}(n)$ is the reconstructed signal, .* denotes an element-wise multiply operation, and conj(.) denotes the conjugate operation.

Next, in 2N samples, n=1,2,...,2N, phase offset theta can be obtained with the equation of:

$$theta = \frac{1}{N} \; mean[x(N+1:2N).*conj(x(1:N))], \qquad \text{Equation 3}$$

where mean(.) denotes the arithmetic mean operation,

The desired frequency offset can be therefore calculated with the following equation:

$$f_{estimated} = \frac{theta}{2\pi T}; \qquad \text{Equation 4}$$

where T denotes symbol cycle of the received signal,

Comparison unit 208 determines the threshold for comparison on the basis of estimated channel h(n). The threshold can be defined with function θ(n), the detail of which is well known in the art.

The frequency offset estimate adjustment unit 210 connects to the comparator 208 and frequency offset estimation unit 206, and makes adjustment to the offset estimate based on the threshold.

In the above description, the sections of the automatic frequency correction device 200 that is similar to that of the prior art device are not detailed described herein for it is well known in the art.

Figure 3:
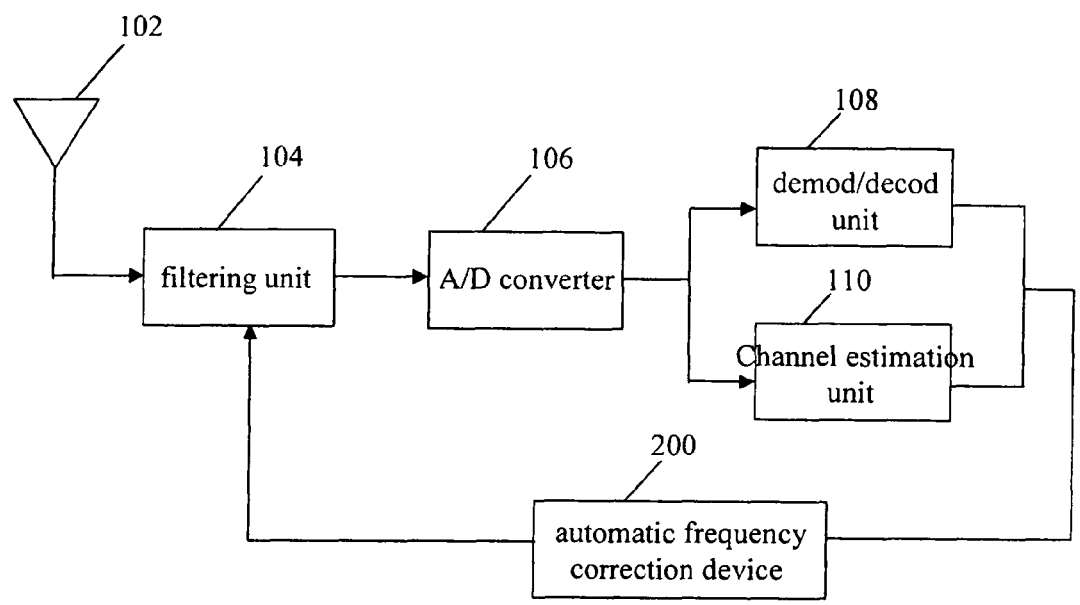
FIG. 3 is a block diagram depicting the arrangement of the automatic frequency correction apparatus in accordance with the present invention.

Turning to FIG. 3, a block diagram of the automatic frequency correction device 200 for use in the wireless receiver 300 is shown. The receiver includes: an antenna 102 for signal receiving, a filtering unit 104 for noise and interference filtering, an A/D converter 106 for analog to digital conversion, demodulation and decoding unit 108, and a channel estimation unit 110 for estimating channel characteristic on the basis of received signal. The above sections all have their counterparts in the prior receiver system 100. However, the frequency correction unit in the receiver 300 is different from the prior system, the details of which are described in conjunction with FIG. 3 and in FIG. 4. b(n) is output by the demodulation and decoding unit 108 and h(n) is output by channel estimation unit 110.

Figure 5:
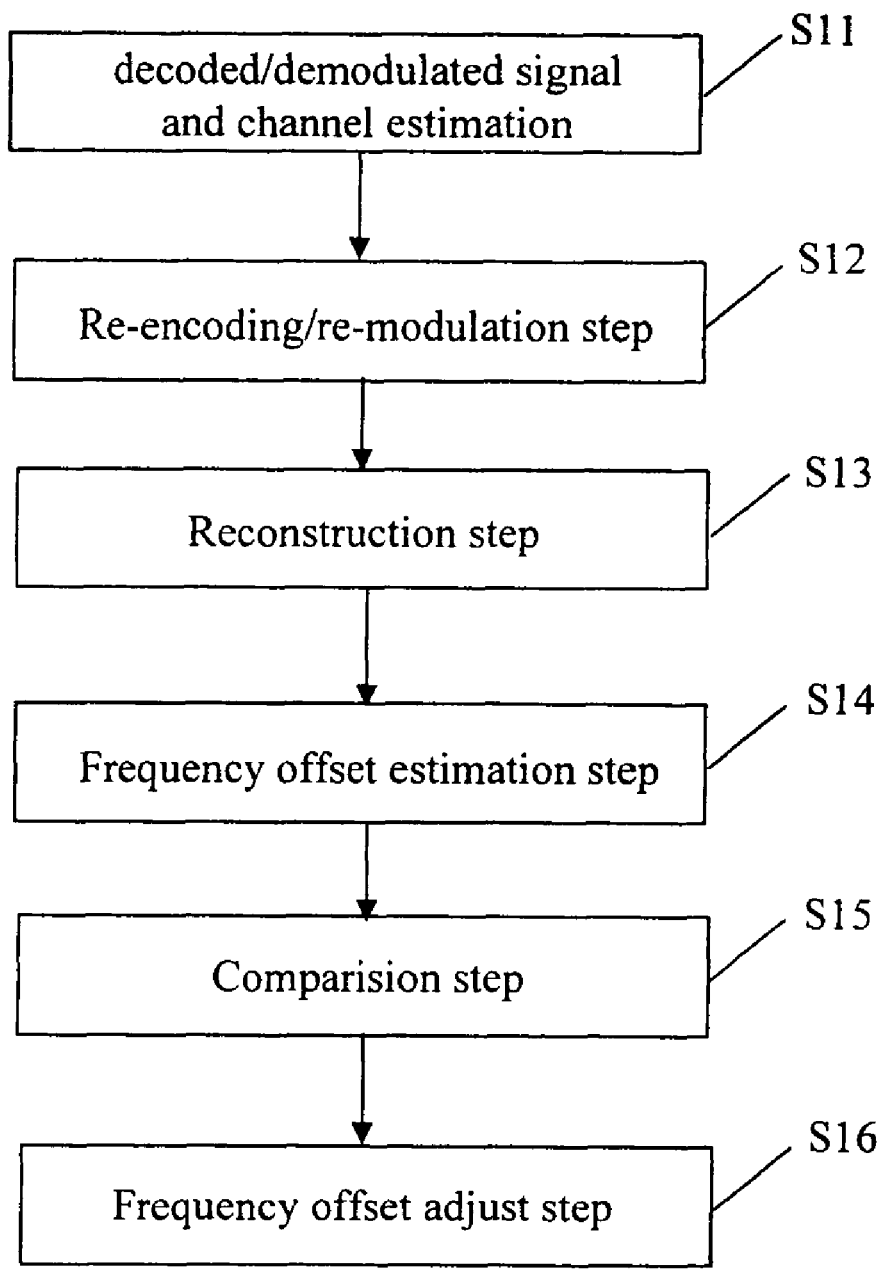
FIG. 5 is a flow chart of the operation of the automatic frequency correction method in accordance with the present invention.

The frequency correction method performed in the above automatic frequency correction device 200 and the wireless receiver 300 will be described in detail with reference to flow chart FIG. 5. The method comprises the steps of:

S11. The receiver receives the original received signal r(n), demodulates and decodes it to generate signal b(n); channel estimate h(n) is also generated on the basis of the received signal, which is known in the art;

S12. Converts signal b(n) by re-encoding and re-modulating into signal s(n) using a different coding and modulation scheme;

S13. Reconstructs with the input of s(n) and estimated channel h(n) to generate the signal r̃(n). Similar to the prior art, the reconstructed signal r̃(n) is obtained with signal s(n) with the estimated channel h(n) using a convolutional encoding scheme which is represented as the following equation:

$$\tilde{r}(n) = s(n) \oplus (h(n)) \qquad \text{Equation 1}$$

S14. Estimates the frequency offset $f_{estimated}$ with the signal r̃(n) and original received signal r(n). The $f_{estimated}$ calculation comprises:

First, the signal x(n) is generated using the equation $$x(n) = conj(r(n)) .* \tilde{r}(n) \qquad \text{Equation 2}$$

where r(n) is the original received signal, r̃(n) is reconstructed signal, .* denotes element-wise multiply operation, conj(.) denotes conjugate operation.

Next, in 2N samples, n=1,2,...,2N, phase offset theta can be obtained with the equation of:

$$theta = \frac{1}{N} \text{ mean}[x(N+1:2N) .* conj(x(1:N))], \qquad \text{Equation 3}$$

where mean(.) denotes arithmetic mean operation,

The desired frequency offset can be therefore calculated with the following equation:

$$f_{estimated} = \frac{theta}{2\pi T}; \qquad \text{Equation 4}$$

where T denotes symbol cycle of the received signal,

S15. Determines the threshold for comparison on the basis of estimated channel h(n). The threshold can be defined with function θ(n), which is known well by one skilled in the relevant art, therefore its implementation is not shown or described in detail to avoid obscuring other aspects of the invention.

S16. Adjusts the frequency offset estimate on the basis of the estimated frequency error $f_{estimated}$ and the defined threshold.

Figure 6A:
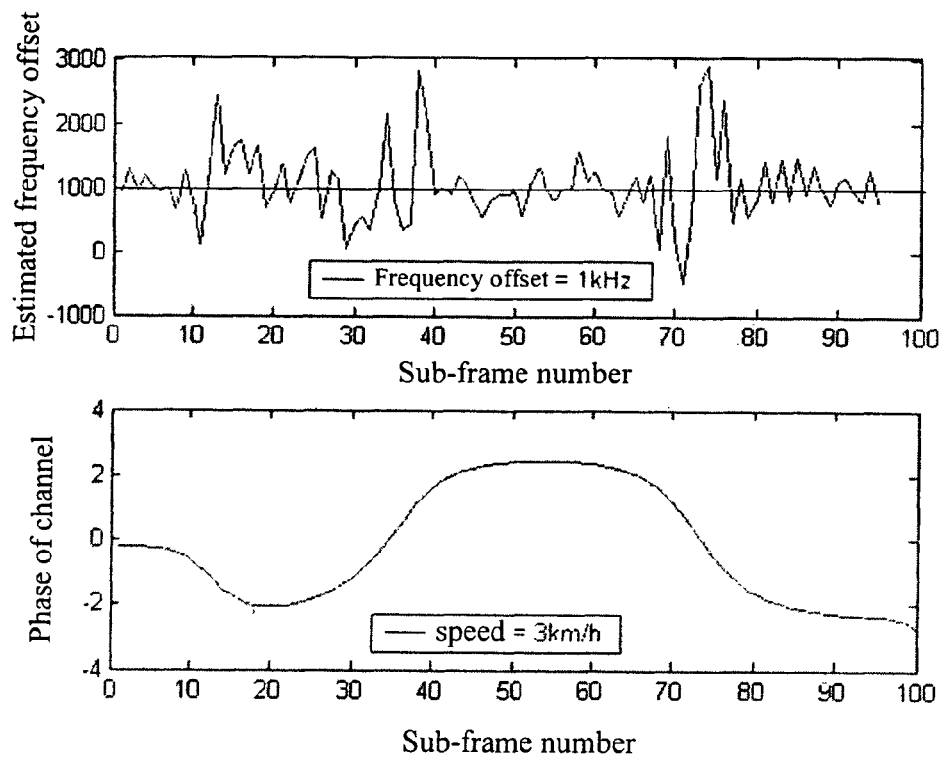
FIGS. 6A-6C illustrate the frequency estimate employing the automatic frequency correction method in accordance with the present invention.
Figure 6B:
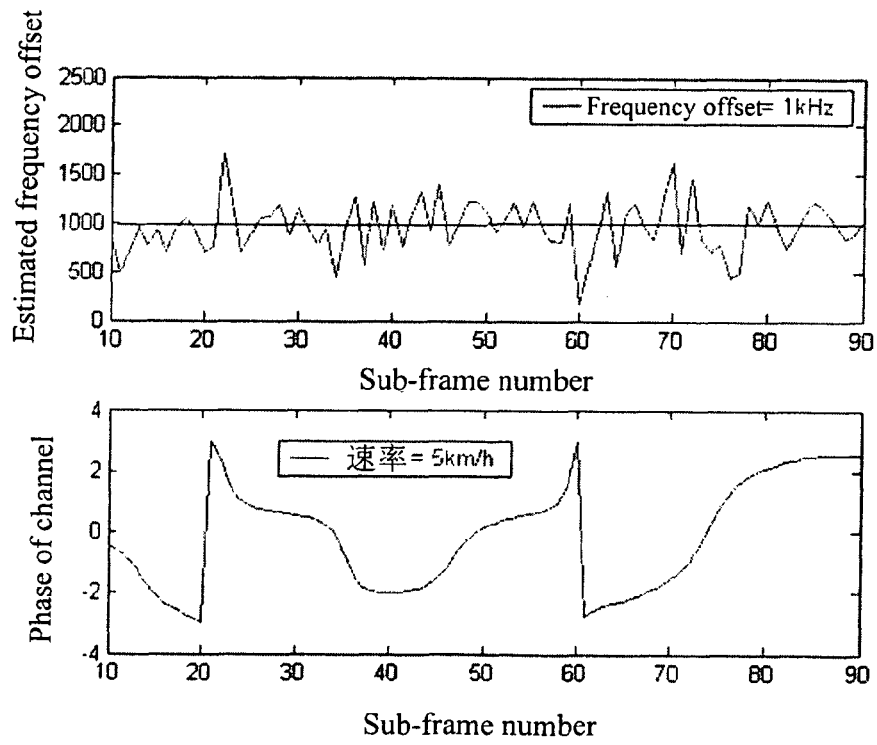
Figure 6C:
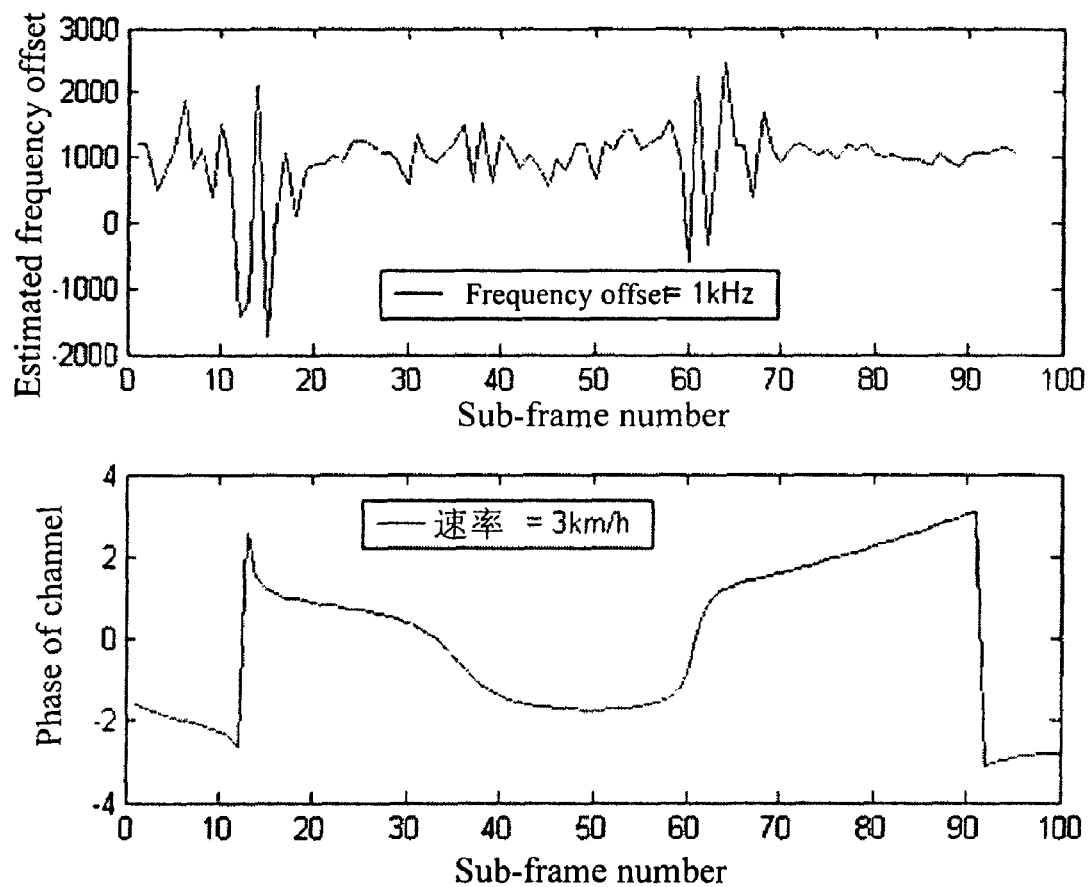

FIGS. 6A-6C illustrate the frequency estimate using the automatic frequency correction method in accordance with the present invention. As is shown in the Figures, when the channel phase changes slowly, the estimated frequency accordingly changes little; while when the channel phase changes rapidly, phase jump may occur. This phase jump should be taken into consideration when using the frequency estimation to conduct offset correction. In this embodiment, a flag is set as one when phase changes slowly; while channel phase changes rapidly, a flag is set to zero. The frequency offset is accordingly adjusted as follows:

$$f(m) = \begin{cases} f_{estimated}(m) & \text{If flag} = 1, \\ f(m-1) & \text{If flag} = 0, \end{cases}$$

Preferably, in the present invention, a forgetting factor $\beta_1$, $\beta_2$ is defined and utilized to further improve correction accuracy. $\beta_1$, $\beta_2$ are defined as a decimal fraction which is less than but very close to one, for example, $\beta_1 = 1 - 1/16 = 0.9375$, $\beta_2 = 1 - 1/32 = 0.9688$. With less than 80 adjustments, it is such defined $f_{adjust}(m) = (1-\beta_1) \cdot f_{adjust}(m-1) + \beta_1 \cdot f(m)$. With more than 160 adjustments, $f_{adjust}(m) = (1-\beta_2) \cdot f_{adjust}(m-1) + \beta_2 \cdot f(m)$ is defined.

The automatic frequency correction device and method in the present invention re-encodes and re-modulates the modulated and decoded signal to generate the reconstructed signal. The frequency offset estimation is conducted on the basis of the reconstructed signal. Thus, a high precision correction may be achieved in this way.

While the invention has been described in the context of an embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

The invention claimed is:

1. An automatic frequency correction device in a wireless receiver, the wireless receiver demodulating and decoding an original received signal and delivering the demodulated and decoded signal and an estimated channel to the device, the device comprising:
a re-coding and re-modulating unit that encodes and modulates the demodulated and decoded signal into a re-coded and re-modulated signal using a scheme different the received signal;
a reconstruction unit connected to the re-coding and re-modulation unit, and which receives the estimated channel and the re-coded and re-modulated signal to generate a reconstructed signal;
a frequency offset estimation unit connected to the reconstruction unit for calculating an offset amount using the reconstructed signal and the original received signal;
a comparator that receives the estimated channel to determine a threshold; and
an offset estimate adjustment unit connected to the output of the comparator and the frequency offset estimation unit, wherein the offset estimate adjustment unit adjusts the frequency offset based upon the comparator output and the offset amount.

2. The apparatus of claim 1, wherein the reconstructed signal is obtained by convolutional coding of the re-coded and re-modulated signal and the estimated channel.

3. The apparatus of claim 1 wherein the frequency offset is calculated as follows:

$x(n)=conj(r(n)).*\tilde{r}(n)$

Wherein r(n) is the original received signal, r̃(n) is the reconstructed signal, * denotes element-wise multiply operation, conj(.) denotes conjugate operation;

In 2N samples, n=1,2, . . . ,2N, phase offset theta can be obtained as:

$$theta = \frac{1}{N}\text{mean}[x(N+1:2N).*conj(x(1:N))],$$

where mean(.) denotes arithmetic mean operation; and $$f_{estimated} = \frac{theta}{2\pi T};$$

where T denotes the symbol cycle of the original received signal.

4. A receiver in the wireless communication system comprising:
- an antenna for receiving an original received signal;
- a filter unit connected to the antenna for signal noise and interference filtering;
- an A/D converter connected to the filter unit;
- a demodulation and decoding unit connected to the A/D converter for signal decoding and demodulation;
- a channel estimation unit connected to the A/D converter for generating an estimated channel;
- an automatic frequency correction device comprising:
  - (a) a re-coding and re-modulating unit that encodes and modulates the demodulated and decoded signal into a re-coded and re-modulated signal using a scheme different the received signal;
  - (b) a reconstruction unit connected to the re-coding and re-modulation unit, and which receives the estimated channel and the re-coded and re-modulated signal to generate a reconstructed signal;
  - (c) a frequency offset estimation unit connected to the reconstruction unit for calculating an offset amount using the reconstructed signal and the original received signal;
  - (d) a comparator that receives the estimated channel to determine a threshold; and
  - (e) an offset estimate adjustment unit connected to the output of the comparator and the frequency offset estimation unit, wherein the offset estimate adjustment unit adjusts the frequency offset based upon the comparator output and the offset amount.

5. The receiver of claim 4, wherein the reconstructed signal is obtained by convolutional coding of the re-coded and re-modulated signal and the estimated channel.

6. The receiver of claim 4, wherein the frequency offset is calculated as follows:

$x(n)=conj(r(n)).*\tilde{r}(n)$

Wherein r(n) is the original received signal, r̃(n) is the reconstructed signal, * denotes element-wise multiply operation, conj(.) denotes conjugate operation;

In 2N samples, n=1,2, . . . ,2N, phase offset theta can be obtained as:

$$theta = \frac{1}{N}\text{mean}[x(N+1:2N).*conj(x(1:N))],$$

where mean(.) denotes arithmetic mean operation; and $$f_{estimated} = \frac{theta}{2\pi T};$$

where T denotes the symbol cycle of the original received signal.

7. A method for automatic frequency offset correction in a wireless receiver that receives an original received signal over a channel comprising:
- demodulating and decoding the original received signal;
- performing a channel estimation of the channel to determine a channel estimate;
- re-encoding and re-modulating the decoded and demodulated signal with a coding and modulation scheme different from the original received signal;
- generating a reconstructed signal based on the re-encoded and re-modulated signal and channel estimate;
- estimating a frequency offset estimate based on the reconstructed signal and the original received signal;
- determining a threshold for a comparator on the basis of the channel estimate; and
- adjusting the frequency offset on the basis of the frequency offset estimate and the comparison threshold.

8. The method of claim 7, wherein the reconstructed signal is obtained by convolutional coding of the re-coded and re-modulated signal and the estimated channel.

9. The method of claim 7 wherein the frequency offset estimate is calculated as follows:

$x(n)=conj(r(n)).*\tilde{r}(n)$

Wherein r(n) is the original received signal, r̃(n) is the reconstructed signal, * denotes element-wise multiply operation, conj(.) denotes conjugate operation;

In 2N samples, n=1,2, . . . ,2N, phase offset theta can be obtained as:

$$theta = \frac{1}{N}\text{mean}[x(N+1:2N).*conj(x(1:N))],$$

wherein mean(.) denotes arithmetic mean operation; and $$f_{estimated} = \frac{theta}{2\pi T};$$

where T denotes the symbol cycle of the original received signal.

* * * * *